March 30, 1954

T. J. KEARNEY 2,673,835

DEGREASING MACHINE

Filed Oct. 19, 1950

INVENTOR:
Thomas J. Kearney
BY Paul & Paul
ATTORNEYS.

March 30, 1954 — T. J. KEARNEY — 2,673,835
DEGREASING MACHINE
Filed Oct. 19, 1950 — 6 Sheets-Sheet 4

INVENTOR:
Thomas J. Kearney
BY Paul & Paul
ATTORNEYS.

T. J. KEARNEY 2,673,835

DEGREASING MACHINE

Filed Oct. 19, 1950

INVENTOR:
Thomas J. Kearney

BY

ATTORNEYS.

Patented Mar. 30, 1954

2,673,835

UNITED STATES PATENT OFFICE 2,673,835

DEGREASING MACHINE

Thomas J. Kearney, Detroit, Mich., assignor to Detrex Corporation, Detroit, Mich., a corporation of Michigan Application October 19, 1950, Serial No. 190,909

11 Claims. (Cl. 202—170)

This invention relates to improvements in apparatus for degreasing work objects, and more particularly concerns a degreasing machine having work object carriers mounted for intermittent progression within an enclosure wherein the degreasing of the work objects takes place.

Manually operated as well as conveyorized machines for degreasing metal and other articles by immersion in degreasing liquids or by passing such articles through vapors of degreasing chemicals are well known in the art. However, the manually operated degreasers are subject to the objection of limited capacity, high cost, and the requirement of excessive labor. While conveyorized degreasers are highly efficient and desirable, they require rather substantial floor space and are most advantageously used in connection with large scale degreasing operations for processing large numbers of substantially similar work objects.

In view of the relatively high cost of degreasing chemicals, numerous attempts have been made to minimize solvent loss in degreasing operations using solvent vapors. It has been proposed to provide degreasing machines with hoods for collecting such vapors, and with apparatus for condensing the vapors and returning them to the machine for re-use. In devices of this character the solvent reclamation equipment has very materially increased degreasing costs. Moreover such equipment is usually located near the top of the degreasing machine in a position obstructing the free insertion and withdrawal of work objects into and out of the machine; accordingly the provision of specialized loading and unloading equipment has been necessitated, with attendant cost increase.

It is accordingly an object of this invention to provide a compact degreasing machine capable of being constructed and operated with optimum convenience and at minimum cost. Another object of the invention is to provide a degreasing machine having capacity to process large numbers of work objects having different sizes and shapes. Still another object is to provide an apparatus mounted wholly within an enclosure and having a plurality of separate compartments through which the work objects are advanced in accordance with a definite sequence in order to provide optimum degreasing with minimum solvent loss in a minimum time. Other objects and advantages of the invention, including the simplicity and economy of the same, will appear further hereinafter.

In summary, the foregoing and other objects are attained by providing a degreasing machine having an enclosure, a reservoir for degreasing liquid in said enclosure, means for providing degreasing chemical vapors above the liquid in said reservoir, and rotatable means constructed to carry said work objects through said vapor, then into contact with said liquid, and subsequently upwardly through said vapor, all within said enclosure.

Figure 1:
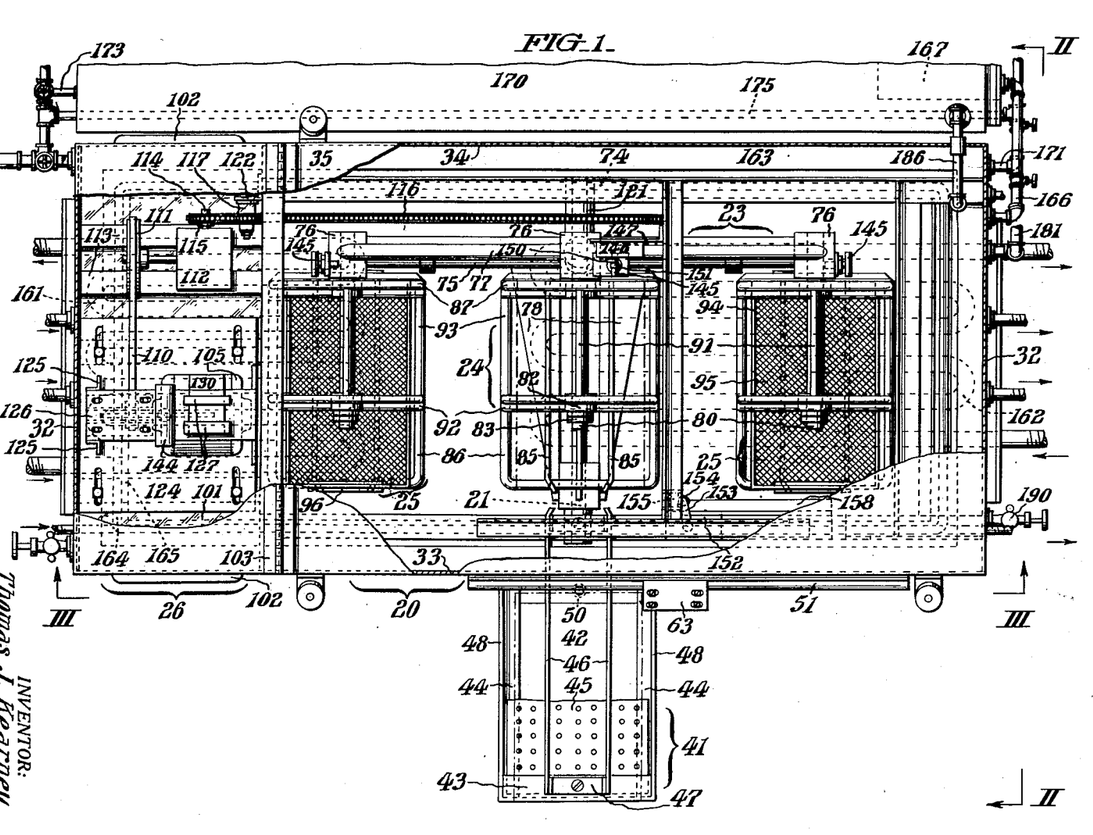
Fig. 1 represents a plan view of a degreasing machine constituting one embodiment of the invention, with parts broken away and others shown in section in order to disclose important details.
Figure 2:
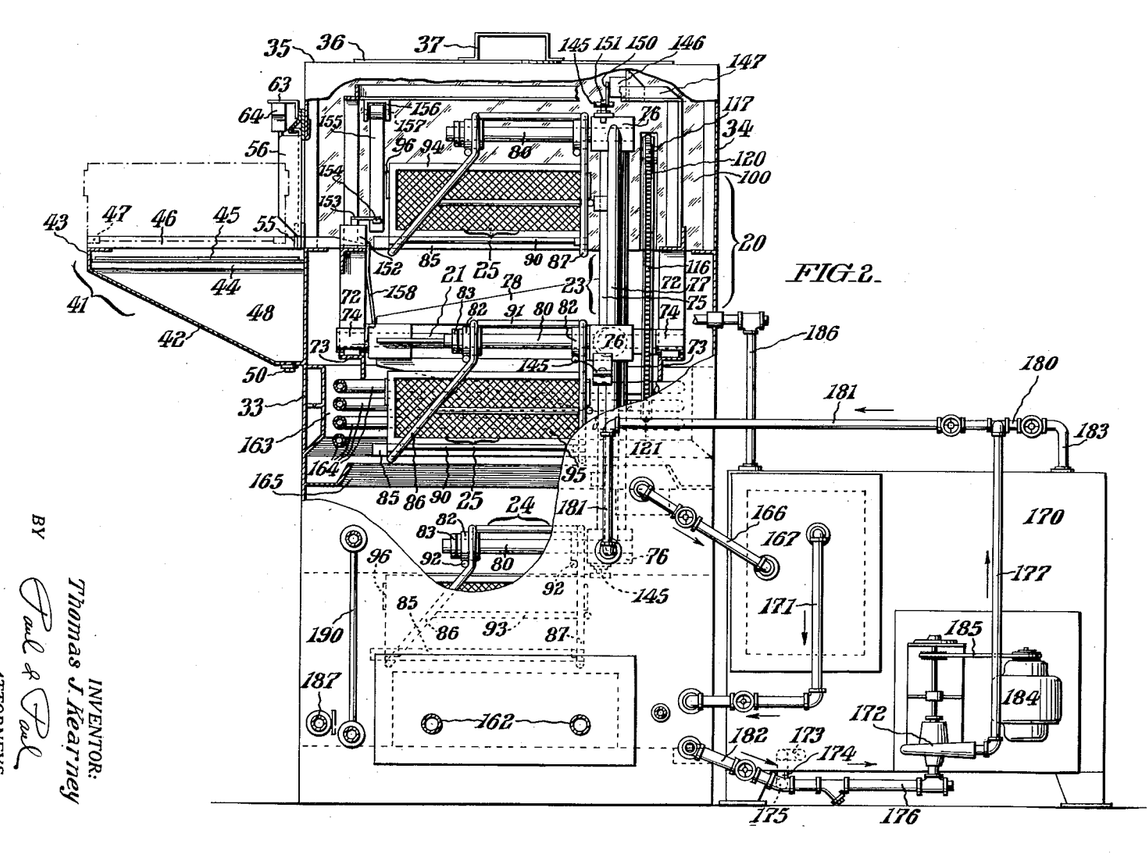
Figs. 2 and 3 represent end and front views of the same, taken as indicated by the lines and arrows II—II and III—III of Fig. 1, respectively, parts also being broken away and shown in section.
Figure 3:
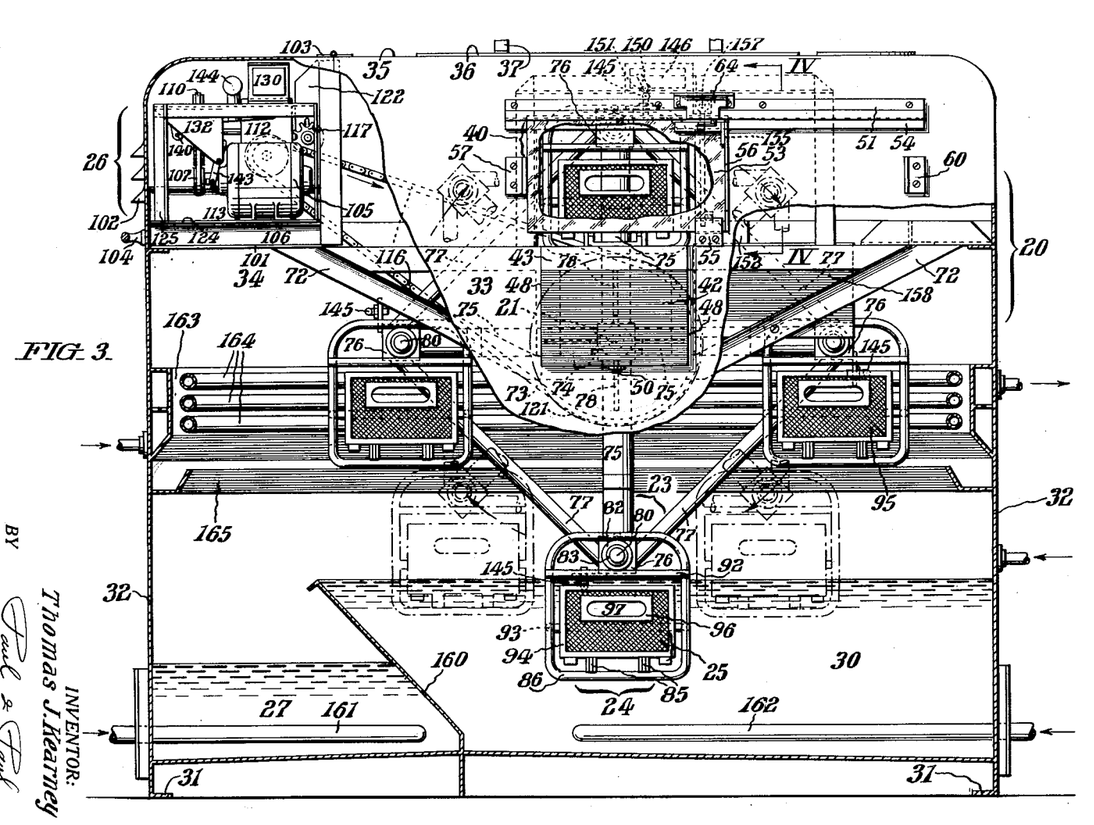
Figure 4:
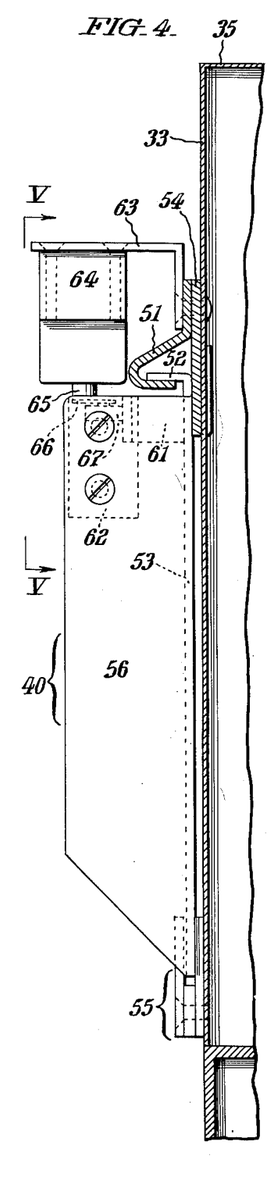
Fig. 4 represents a fragmentary detail view showing the structure of the door operating mechanism of the degreasing machine, taken as indicated by the lines and arrows IV—IV which appear in Fig. 3.
Figure 5:
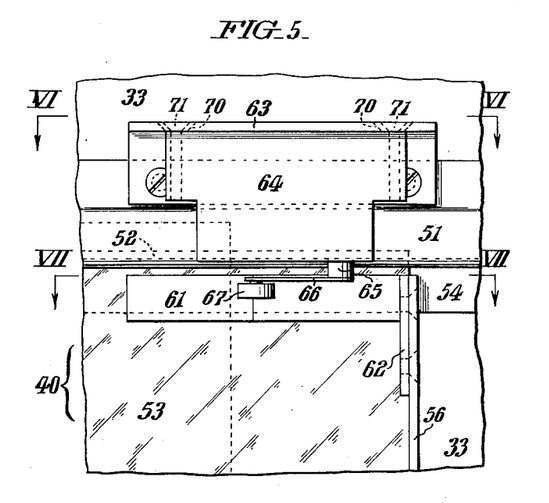
Fig. 5 represents a sectional view taken as indicated by the lines and arrows V—V which appear in Fig. 4.
Figure 6:
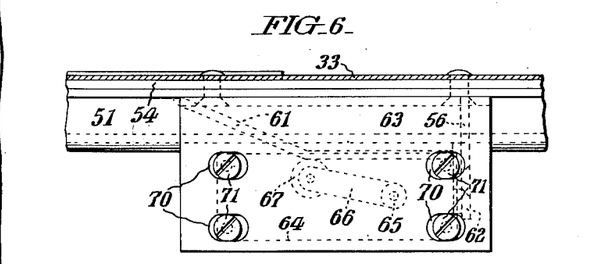
Figs. 6 and 7 are sectional views taken as indicated by the lines and arrows VI—VI and VII—VII, respectively, which appear in Fig. 5.
Figure 7:
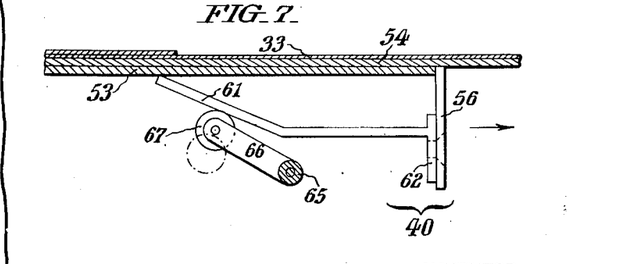

Having reference particularly to Figs. 1-3 of the drawings, the machine has an enclosure 20 wherein a central shaft 21 is rotatably supported and within which the work objects to be degreased are processed. This central shaft 21 supports the rotatable frame 23 which is constructed and arranged to support the pendant frames 24 as it rotates about the central shaft 21. The work articles to be degreased are carried in baskets 25, the latter being supported by pendant frames 24, and are thereby carried through the degreasing cycle in a manner further to be described. Adjacent the enclosure 20 is the separate compartment generally designated 26 serving to house the drive mechanism for the degreaser. Solvent vaporizing compartment 27 and immersion chamber 30 contain a degreasing solvent such as trichlorethylene or perchlorethylene, for example.

The degreasing machine is supported on flanges 31 constituting extensions of side walls 32. The front wall 33, back wall 34 and top 35 complete the enclosure. Top 35 supports an access door 36 having handles 37 while the sliding door 40 is a part of front wall 33 as will be described in further detail.

Also mounted on the front wall 33 is the side board assembly 41 consisting of inclined plate 42, front angle iron 43, and side angle irons 44. Perforated removable drain plate 45 is supported horizontally by the irons 44. A pair of rails 46 extend longitudinally of the side board assembly 41 on top of drain plate 45 and these are formed integrally with channel iron 47 which is screwed to front angle iron 43. Thus the assembly 41 provides means for supporting and guiding objects to be inserted into and withdrawn from the degreasing machine and the inclined plate 42 also forms a chamber with the upper portion of front wall 33 and triangular walls 48 and serves to collect any grease, liquid or the like dropping from such objects. The material thus collected may be recovered periodically by removing drain plug 50.

Mounted on the front wall 33 of the machine is a channel iron 51 (see particularly Figs. 4–7) which support the door plate flange 52 in the upper end of door plate 53 which constitutes the main plate of sliding door 40. A spacer plate 54 is secured by rivets between the front wall 33 and the channel iron 51. At its lower end the door 40 is supported in a channel 55. End flange 56 in combination with channel 55 and stop 57 (Fig. 3) serve to limit the extent of movement of the door 40 in one direction across the face of the degreasing machine, while door stop 60 serves the same purpose as to movement of the door in the other direction. A wedge strip 61 having a flange 62 is screwed to the end flange 56 of the door.

Secured by means of angle iron 63 to front wall 33, above the door 40, is an electric switch 64 having a rotatable shaft 65 to which is affixed a swivel arm 66 carrying roller 67. The shaft 65 is spring-urged to bias the roller 67 toward the wedge strip 61. It will be observed that the arm 66 is swung about the axis of the shaft 65 under the influence of the wedge strip 61 when the door is moved to one side and is swung in the opposite direction under the influence of the spring when the door is moved to the other side, or in the direction indicated by the arrow in Fig. 7.

The angle iron 63 carries longitudinal slots 70 for accommodating the set screws 71 which serve to support the switch 64. The position of the switch 64 may be thereby adjusted longitudinally relative to the door 40 to secure switch action at the desired point in response to movement of the door 40. The switch 64 is electrically connected to the drive means for the degreaser and serves to inactivate the drive means and to prevent the drive means from operating when the door 40 is open.

Within the enclosure 20 the rotatable degreasing mechanism is supported on a longitudinal frame consisting of inclined angle irons 72 and horizontal angle irons 73, which are disposed centrally in the enclosure between the lower ends of inclined angle irons 72. Bearings 74 are mounted on the angle irons 73 and receive the central shaft 21 which is free to rotate about a horizontal axis.

The four radially disposed shafts 75, which support the corner members 76 of the rotatable frame including the four strut bars 77, are keyed to the central shaft 21. Angle plates 78 are attached to radially disposed shafts 75 and to central shaft 21, and serve as stiffeners. Pressed into apertures in corner members 76 are four rack carrying shafts 80 which have free ends and overhang into the central portion of the enclosure 20. The frames 24 for carrying the work objects are rotatably suspended from the rack carrying shafts 80 by means of bearings 82 and are held against lateral displacement by hubs 83. Such frames 24 are constructed to carry the baskets 25. The frames 24 carry a pair of horizontal tracks 85 upon which the baskets are supported for sliding movement toward and away from the loading rack assembly 41.

The frames 24 each comprise the front inclined bars 86, rear vertical bars 87, the bottom bars 90, top bars 91 and brace bars 92 and 93. Baskets 25 are composed of rectangular frame plates 94 to which are attached wire mesh 95 forming the side and end walls and bottom of each of the baskets 25. The end walls of the baskets are provided with handhole frames 96 having handholes 97.

Figure 8:
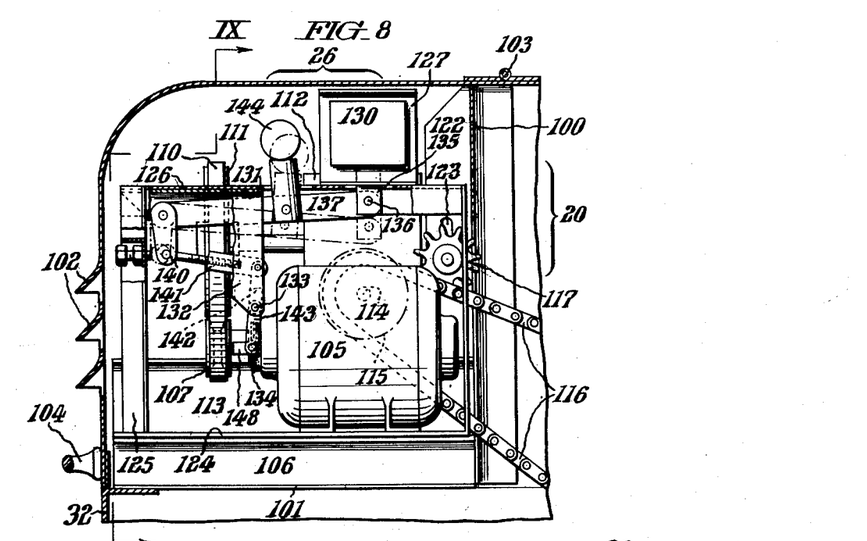
Fig. 8 represents an enlarged fragmentary view of the driving mechanism for the degreaser, which constitutes the upper left-hand corner portion of the machine as represented in Fig. 3.
Figure 9:
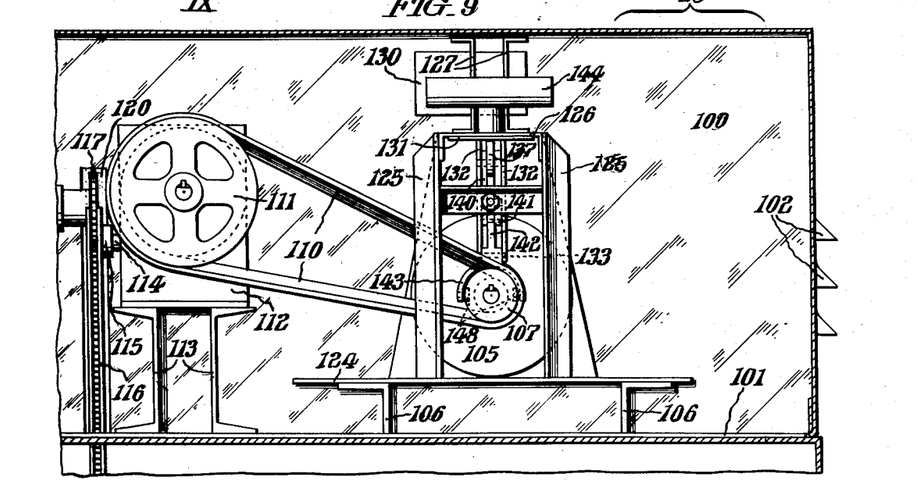
Fig. 9 represents a sectional view taken as indicated by the lines and arrows IX—IX which appear in Fig. 8.

The drive means for the degreaser appears in more particular detail in Figs. 8 and 9. This mechanism is housed in the separate compartment 26, substantially isolated from the degreasing enclosure 20 by the back partition 100 and by the floor 101. Compartment 26 has a cover attached to the top of the degreaser by means of hinges 103 with louvres 102 for ventilation. Handles 104 provide means whereby the compartment cover may be swung upwardly for access. Electric motor 105 which is mounted on support beams 106 is operatively connected through a clutch mechanism, further to be described hereinafter, to drive the sheave 107 which accommodates the drive belt 110. Belt 110 drives pulley 111 of a single worm gear reducer 112, the latter being supported in the enclosure 26 by channel irons 113. The gear reducer 112 has an output shaft 114 carrying sprocket pinion 115 which engages the endless roller drive chain 116. Roller drive chain 116 passes under idler gear 117 which serves as a chain tightener, through the narrow slot 120 in back partition 100 and is trained around sprocket 121 which is keyed to the central shaft 21 adjacent the rotatable frame 23 of the degreasing apparatus. Idler gear 117 is adjustably positioned on plate 122 by means of slot 123 and conventional set screws.

The motor drive mechanism includes automatically actuated clutch means for attaining intermittent operation of the degreasing mechanism, as follows. Base plate 124, mounted horizontally on beams 106, supports vertical angle irons 125 to which is attached the transverse channel iron 126. Channel irons 127 for housing solenoid 130 are supported on these transverse channel irons 126 and disposed through apertures therein. Stiffener plate 131 is affixed to the underside of channel iron 126. A pair of triangular pivot plates 132 depend from stiffener plate 131 and these plates carry a pivot pin 133 to provide a fixed pivot for the clutch operating mechanism. The output shaft of motor 105 is keyed to clutch plate 134 which is spring urged along the output shaft in the direction of the body motor 105. The sheave 107 has a clutch facing adapted to engage the clutch plate 134 to operate the rotatable frame 23 of the degreasing machine. The lever mechanism for sliding the clutch plate 134 toward and away from the sheave 107 and into and out of engagement therewith comprises the solenoid 130, solenoid shaft 135, pivot 136, crank lever arms 137 and 140, turnbuckle lever 141, arm 142, and yoke 143. Clutch plate 134 is free to rotate with respect to yoke 143 but is engaged by blocks 148 carried by the yoke and is moved axially thereby toward sheave 107. Crank lever arm 137 carries a counterweight 144 which serves to move the clutch plate blocks 148 toward the body of motor 105, permitting the spring urged clutch plate 134 to move out of engagement with the sheave clutch plate. The solenoid 130, when energized, serves to overcome the action of counterweight 144 and to move the clutch plate 134 in the other direction, engaging the clutch. As shown in Fig. 8, the clutch is engaged when solenoid 130 is energized, the parts being then in positions represented in solid lines. Upon deenergization of solenoid 130 the parts assume the positions represented in dot and dash lines in Fig. 8, disengaging the clutch.

The mechanism for operating the degreasing machine and for engaging and disengaging the clutch includes electric switches (not shown) one of which starts the motor and the other which may be manually operated to energize the solenoid 130 and to thereby engage the clutch parts.

The machine also has mechanism for automatically deenergizing the solenoid when each pendant frame 24 carrying the work objects comes into registry with the opening of sliding door 40 and the sideboard assembly 41. Such mechanism includes a tripper pin 145 which is mounted on each corner member 76 and a spring-urged limit switch 146 which is disposed on switch frame 147 in the path of advancement of tripper pin 145. Switch 146 has a switch arm 150 and roller 151 which are contacted thereby to open the solenoid-energizing electric circuit thereby deenergizing the solenoid 130, disengaging the clutch mechanism, and permitting the rotatable frame 23 to stop. The single worm gear reducer 112 presents high frictional resistance and serves to lock the rotatable frame 23 against further rotation when the clutch is disengaged, even though the loads then supported on the rotatable frame 23 may not be balanced with respect to the frame center. The mechanism may be restarted by closing an electric circuit which energizes the solenoid 130 independently of limit switch 146 thereby moving tripper pin 145 beyond limit switch 146 and permitting the circuit through limit switch 146 to close under the influence of the spring normally urging the switch arm toward closed position. This may be accomplished manually or by means of a pre-set timing device which operates the clutch mechanism in accordance with a definite time cycle. The electric circuits required are conventional and are not shown.

Another spring-urged switch 152 is connected electrically into the circuit energizing the solenoid 130. This switch has arm 153 and a roller 154 on the end of said arm. The switch 152 is opened by the action of tripper bar 155 when the baskets 25, load articles, or any other objects project beyond the front end of a pendant frame 24 or otherwise as it passes the tripper bar 155. The protruding article displaces the tripper bar 155 and opens the circuit, deenergizing the solenoid 130, and stopping the degreasing machine.

The tripper bar 155 is pivotally attached by means of hanger 156 and pivot pin 157 to the degreaser frame and hangs from the pivot pin 157 to a point near the bottom of the door. Guide plate 158, attached to the frame of the degreasing machine, urges other protruding articles toward the rear of the machine on the pendant frames 24.

The bottom of the enclosure 20 is divided from front to back by the inclined divider wall 160 to form the solvent vaporizing compartment 27 and immersion chamber 30. Compartment 27 has steam heating coils 161 which are controlled to regulate the temperature of the degreasing chemicals in compartment 27 at a value above the boiling point of the degreasing chemicals. Accordingly solvent vapors continuously rise from the surface of these chemicals into the enclosure 20. Immersion chamber 30 has steam heating coils 162 which are regulated to provide degreasing chemicals at a temperature a few degrees below the boiling point. It will be observed that, as the basket-carrying frames 24 travel in a circular path about the axis of central shaft 21, in a clockwise direction as viewed in Fig. 3, the contents of the basket 24 are dipped into hot liquid degreasing chemicals in immersion chamber 30 and are then passed through vapors of the degreasing chemicals rising from solvent vaporizing compartment 27.

Mounted on the inside surfaces of the walls of the enclosure 20, above both compartments 27, 30 are the horizontally extending water jacket 163 and condenser tubes 164. These serve to cool and condense the solvent vapors rising in the enclosure and to keep the upper portions of enclosure 20 relatively vapor-free. Also mounted on the walls of the degreaser, below the water jacket 163 and condenser tubes 164, is the trough 165 which serves to collect the condensate formed on the jacket 163 and condenser tubes 164 and as a shield barring the return of condensate directly to the vaporizing compartment 27, thus serving to return the condensed solvent to the immersion chamber 30 through conduit 166, conventional water separator 167 which is built into the storage tank 170, and conduit 171. Thus the solvent in immersion chamber 30 receives a continuous flow of distilled solvent which is free of oil and grease, minimizing the oil and grease content of the solvent in immersion chamber 30. Solvent overflows continuously from immersion chamber 30 to chamber 27.

Solvent storage tank 170 has sufficient capacity to store the entire solvent contents of the degreasing machine. Solvent transfer pump 172 is provided to move the contents of the storage tank 170 through conduits 173, 174, 175, 176 and to pump such solvent to the immersion chamber 30 through the conduits 177, 181. Solvent transfer pump 172 is also adapted to drain the immersion chamber 30 through conduits 182, 176 and to transfer this solvent to the storage tank 170 through conduits 177, 180, 183. Transfer pump 172 is driven in conventional manner by electric motor 184 and belt 185. The storage tank 170 is provided with a vent 186 which discharges into enclosure 20 above the level of water jacket 163.

The end wall of the enclosure 20 is apertured to receive the thermometer 187 and liquid level indicator 190 in conventional manner. The temperature of the solvent in immersion chamber 30 is held substantially constant by means of a temperature control device, as is well known in the art, to provide hot solvent at a substantially constant temperature below the boiling point.

From the foregoing description the operation of the apparatus will readily be apparent. Assuming the operative elements of the machine are stationary, that the compartments 27 and 30 are filled to the proper levels with degreasing chemicals at the desired temperatures, and that water is flowing through the water jacket 163 and condenser tubes 164, the operator slides the door 40 to a fully open position and removes the basket 25 from the pendant frame 24 which is immediately within the door opening. The basket 25 is filled with work objects to be degreased and re-inserted on the pendant frame 24. The door 40 is closed and the start switch is closed. This engages the motor clutch plate 134 with the belt drive sheave 107 thereby starting the slow rotation of frame 23. The rotation continues through an arc of 90° in the example selected for illustration, until tripper pin 145 of the next following pendant frame 24 contacts the limit switch 146, stopping the machine when the pendant frame 24 is in registry with the door opening. This process is repeated, the rotatable frame indexing through an angle of 90 degrees each time until it is automatically stopped. Thus each charge of work objects in a basket 25 is first subjected to vapor treatment, then is immersed in hot degreasing chemicals, is then removed from the liquid and subjected to further and more intense vapor treatment while positioned substantially above the vapor-producing compartment 27, is then raised above the level of water jacket 163 and condenser tubes 164 for draining and evaporation of solvent, and is eventually removed from the machine.

It is to be observed that the degreasing takes place in every instance in a substantially completely enclosed space with resultant advantage in effectiveness of treatment and minimization of solvent loss. The apparatus may be semi-automatic with manual starting each time the rotatable frame 23 is to be indexed to its next position or may be fully automatic under operation controlled by a timing device connected as previously described. In apparatus embodying the timing device the time of immersion must be at least ample for removal and replacement of baskets through the sliding door opening, and may if desired be greater in order to provide longer periods of degreasing immersion for the work objects.

Figure 10:
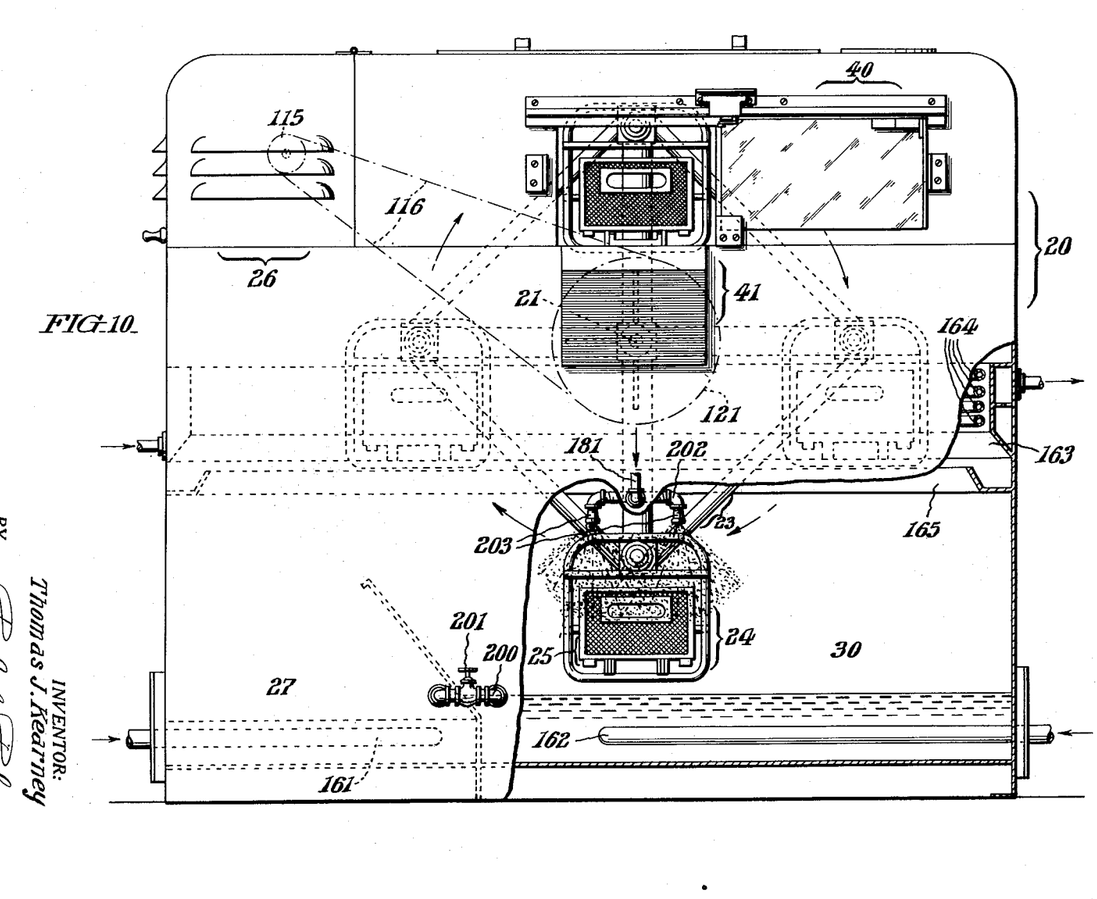
Fig. 10 represents a side elevation, with parts broken away, of a modified form of the degreasing machine.

Having reference now to Fig. 10 of the drawings, wherein another embodiment of the invention is represented, it will be observed that the degreasing machine is substantially similar to the machine represented in Figs. 1-3, and the construction of like parts is not reproduced in detail in Fig. 10, or here repeated. However, a connecting conduit 200, fitted with valve 201, serves to permit degreasing solvent to flow from compartment 30 to compartment 27 thereby maintaining a liquid level in compartment 30 lower than the bottom of pendant frame 24 which is in its lowest position. The conduit 181, through which solvent transfer pump 172 delivers solvent to compartment 30, carries a spray header 202 and a plurality of spray nozzles 203 which are directed downwardly toward the floor of the degreaser and are disposed immediately above the position assumed by the lowermost pendant frame 24. Thus the work objects in the pendant frame 24 are subjected to the high velocity spray of degreasing chemicals as distinguished from the submersion step as represented in Figs. 1-3. Since the operation of the apparatus is otherwise substantially unchanged, it will be apparent that the work objects are first subjected to vapor treatment, then to hot liquid spray, then to hot vapor treatment, and are subsequently permitted to drain and dry, all in successive stages as the pendant frames 24 are indexed circumferentially about the axis of central shaft 21.

It will be apparent that various modifications may be made in the form of the apparatus, including variation in the number and character of pendant frames for carrying work objects and modifications in the arrangement of the degreasing liquid compartments in relation to the arrangement and direction of movement of the rotatable frame. Moreover it is to be understood that certain features of the invention may be used to advantage independently of the use of other features, all within the spirit and scope of the invention. Furthermore, the invention comprehends the substitution of equivalent parts for those herein disclosed, and the reversal and rearrangement of elements for similar or analogous purposes, and is not limited in scope except as expressly indicated in the appended claims.

Having thus described the invention, I claim:

1. A machine for degreasing work objects comprising an enclosure having side walls at least one of which has an opening of sufficient size to accommodate said work objects, a door movably mounted on said enclosure to open and close said opening, a reservoir for degreasing liquid at a definite level in said enclosure, means for providing degreasing chemical vapors above the liquid in said reservoir, a transverse shaft extending transversely of said side walls, a frame mounted on said transverse shaft with capacity for movement in a rotary path within said enclosure, a plurality of work-object carriers on said frame all substantially equidistant from said transverse shaft, said door and said carriers all being at substantially the same distance from said transverse shaft, said opening being adjacent the top of said rotary path, said liquid level being at a lesser distance from said transverse shaft, and the bottom of said reservoir being at a greater distance from said transverse shaft, power means for rotating said frame on said shaft, thereby swinging each carrier through the vapor, then liquid and again the vapor, and power interrupting means for intermittently stopping each said carrier in the vapor, in the liquid, again in the vapor, and then adjacent said door.

2. The invention as defined in claim 1, further characterized by the fact that the door is located at the top of the path of travel of said work-object carriers, the reservoir is disposed at the bottom of said path, and vapor condensing means are provided below said door and above said reservoir.

3. The machine defined in claim 1 further characterized by the fact that said enclosure has at least one wall positioned substantially at right angles to said transverse shaft and that said opening is located in said wall.

4. Apparatus for degreasing work objects, comprising an enclosure having side walls at least one of which has an opening of sufficient size to accommodate said work objects, a shaft extending transversely of said side walls, an article carrying frame rotatably mounted on said shaft, pendant containers rotatably attached at spaced points to said rotatable frame, said pendant containers being constructed and arranged to carry the articles to be degreased in a closed path up and down within said enclosure, a door on said enclosure adjacent said opening, said door and opening being arranged adjacent the top of said closed path, drive means for rotating said framework about said shaft, control means for inactivating said drive means at predetermined intervals to thereby stop the rotation of the rotatable frame when each pendant container is at the top of said path and in registry with said door, means for reactivating said drive means after said rotation is stopped, a source of degreasing liquid, a compartment for disposing said degreasing liquid in the path of advancement of the pendant containers at the bottom of said path, means for providing degreasing vapors in said enclosure in a vapor space disposed at a location removed from the location of said degreasing liquid, and also in the path of said pendant containers, and condensing means arranged within said compartment at a level below the top of said path, said condensing means having capacity to condense said vapor thereby forming an upper vapor level at a level below the top of said path, whereby the work objects in the pendant containers are succesively subjected to the degreasing action of the degreasing liquid and vapor within the enclosure, said compartment, vapor space and door being spaced from one another and arranged in relation to the spacing of the pendant containers that when one pendant container is in registry with said door another is in the liquid compartment and another in said vapor space.

5. A machine for degreasing work objects comprising an enclosure having side walls at least one of which has an opening of sufficient size to accommodate said work objects, a rotatable frame mounted on a horizontal axis in said enclosure, said axis extending transversely of said side walls, article holders on said frame equally spaced from one another and equally spaced from said axis, whereby said article holders are arranged to travel in a circular path in a vertical plane in said enclosure, a reservoir for degreasing liquid at the bottom of said path, heating means in said enclosure for vaporizing degreasing liquid thereby providing degreasing liquid vapors above the liquid level in said reservoir, condensing means in said enclosure at a level about midway between the top and bottom of said circular path, said condensing means having capacity to condense said vapor at about said midway level, power means for rotating said frame about its axis, and power interrupting means for stopping the rotation of the frame when one of said article holders reaches the top of said path, when another article holder is in the liquid at the bottom of said path and when other article holders are in the vapor at about the level of said condensing means midway between the top and bottom of said circular path.

6. The machine defined in claim 5, further characterized by the fact that the reservoir includes a partition forming two compartments therein, the top of said partition being above the bottom of said circular path, one of said compartments being a degreasing fluid vaporizing compartment and the other a degreasing fluid reservoir compartment which overflows said partition into said vaporizing compartment, and by-pass means connected to both said compartments below the top of said partition and below the bottom of said circular path for bringing the liquid in both said compartments to a common level wholly below said path.

7. A machine for degreasing articles comprising an enclosure having side walls at least one of which has an opening of sufficient size to accommodate said articles, a rotatable frame in said enclosure, said frame being rotatable about an axis extending transversely of said side walls, article carriers mounted on said frame with capacity to move said articles through a closed path up and down in said enclosure, said opening being adjacent the top of said closed path, a first reservoir for degreasing liquid above the bottom of said closed path, a second reservoir for degreasing liquid, heating means for heating the liquid in said first reservoir, heating means for vaporizing the degreasing liquid in said second reservoir, whereby said articles may be degreased by liquid in the first reservoir and vapor above the second reservoir, condensing means in said enclosure above the reservoirs for condensing the vaporized degreasing liquid, condensate collecting means in said enclosure arranged to return the condensate to said first reservoir thereby maintaining the level of the first reservoir above the level of the second reservoir, a liquid by-pass communicating with both said reservoirs below the bottom of said closed path, and means for opening said by-pass thereby bringing the liquid in the reservoirs to a common level below the lowest level reached by the articles, whereby said articles are degreased by the action of vapor alone when said by-pass is open.

8. The machine defined in claim 7 further characterized by the fact that spray means are provided in said enclosure near the bottom of said closed path for spraying the liquid on the articles.

9. The machine defined in claim 7 further characterized by the fact that spray means are provided in said enclosure below the vapor line and above the bottom of said closed path.

10. A machine for degreasing work objects comprising an enclosure having a pair of spaced apart side walls at least one of which has an opening of sufficient size to accommodate said work objects, a first reservoir for degreasing liquid in said enclosure, a second reservoir beside said first reservoir containing boiling degreasing liquid thereby providing degreasing chemical vapors above the liquid level in said first reservoir, a rotatable frame mounted on an axis extending transversely of said side walls directly above said first reservoir, said rotatable frame being constructed to carry said work objects in a rotary path through said vapor, then into contact with the liquid in said first reservoir and subsequently upwardly into the vapor directly above said second reservoir, said side wall opening being adjacent the top of said rotary path, condensing means spaced above the liquid level in said first reservoir and extending above both said first and second reservoirs, and condensate collecting means disposed below said condensing means, said condensate collecting means including a shield intermediate said condensing means and said second reservoir constructed and arranged to return the collected condensate to said first reservoir, the first and second reservoirs being immediately adjacent to one another and separated by a barrier, whereby the liquid in said first reservoir may overflow said barrier to said second reservoir, and by-pass means connected to both said first and second reservoirs at a level below the top of said barrier and below the path of travel of said work objects for bringing the liquid in said first reservoir to the level of the liquid in said second reservoir.

11. A machine for degreasing work objects comprising an enclosure having side walls including an opening of sufficient size to accommodate said work objects, a rotatable frame pivotally mounted for rotation about a transverse axis in said enclosure, said axis extending transversely of said side walls, a plurality of overhanging carrier arms supported on said support, each said arm projecting from said support transversely across the enclosure substantially parallel to said transverse axis, each said carrier arm having a free end adjacent one side of said enclosure, a plurality of work object containers carried by said carrier arms, said opening being adjacent the top of said circular path and extending through the side of the enclosure adjacent said carrier arm free ends, and means in said enclosure for contacting the work objects with degreasing vapor and degreasing liquid.

THOMAS J. KEARNEY.

References Cited in the file of this patent

UNITED STATES PATENTS

| Number | Name | Date |
|---|---|---|
| 1,000,084 | Frederickson | Aug. 8, 1911 |
| 1,289,326 | Walker et al. | Dec. 31, 1918 |
| 2,036,261 | Dinley | Apr. 7, 1936 |
| 2,124,460 | Cary et al. | July 19, 1938 |
| 2,164,768 | Frieden | July 4, 1939 |
| 2,240,989 | Hood et al. | May 6, 1941 |
| 2,248,662 | Edhofer | July 8, 1941 |
| 2,273,939 | Dammers | Feb. 24, 1942 |
| 2,280,811 | Edhofer et al. | Apr. 28, 1942 |
| 2,297,199 | Buddecke | Sept. 29, 1942 |
| 2,366,949 | Woppman et al. | Jan. 9, 1945 |
| 2,416,571 | Cosway | Feb. 25, 1947 |
| 2,446,344 | Smith | Aug. 3, 1948 |
| 2,539,112 | Bash | Jan. 23, 1951 |